United States Patent [19]

Akesson

[11] Patent Number: 4,489,735
[45] Date of Patent: Dec. 25, 1984

[54] THRESHING MACHINE

[75] Inventor: Yngve R. Akesson, Halsingborg, Sweden

[73] Assignee: Societe d'Assistance Technique pour Produits Nestle S. A., Lausanne, Switzerland

[21] Appl. No.: 447,163

[22] Filed: Dec. 6, 1982

[30] Foreign Application Priority Data

Dec. 12, 1981 [EP] European Pat. Off. ........ 81110391.0

[51] Int. Cl.³ .............................................. A01O 45/24
[52] U.S. Cl. ................................ 130/30H; 130/27 T; 130/27 AB; 56/14.6; 56/16.5
[58] Field of Search ................ 56/14.6, 16.5, 327 R, 56/DIG. 19; 130/27 R, 27 T, 27 AB, 30 G, 30 H

[56] References Cited

U.S. PATENT DOCUMENTS

| 728,759 | 5/1903 | Pillmore et al. | 130/30 H |
|---|---|---|---|
| 2,309,630 | 2/1943 | Back | 130/30 H |
| 2,943,430 | 7/1960 | Carruthers | 56/14.6 |
| 3,416,298 | 12/1968 | Erdman | 56/327 R |
| 3,545,185 | 12/1970 | Whitfield et al. | 56/14.6 |
| 3,826,267 | 7/1974 | Scribner | 130/30 H |
| 3,973,380 | 8/1976 | Knollman | 56/14.6 |

FOREIGN PATENT DOCUMENTS

| 2419420 | 12/1975 | Fed. Rep. of Germany | 374/52 |
|---|---|---|---|
| 2935530 | 3/1981 | Fed. Rep. of Germany | 562/525 |
| 1396931 | 6/1975 | United Kingdom | 56/14.6 |
| 2057241 | 4/1981 | United Kingdom | 310/156 |
| 235451 | 11/1969 | U.S.S.R. | 56/14.6 |
| 762784 | 9/1980 | U.S.S.R. | 56/14.6 |

Primary Examiner—Gene Mancene
Assistant Examiner—John G. Weiss
Attorney, Agent, or Firm—Vogt & O'Donnell

[57] ABSTRACT

A threshing machine for peas consisting of a horizontal sieve drum rotatable about a longitudinal axis, containing at least two beater shafts located with their axles parallel to the longitudinal axis of the sieve drum to form several threshing areas, a longitudinal conveyor at the inlet end of the sieve drum for throwing threshed product thereinto characterised in that a prebeater unit comprising a plurality of beater mechanisms extends in a longitudinal direction above the longitudinal conveyor and below a fixed hood, the beater mechanisms having shafts mounted laterally across the width of the longitudinal conveyor and equipped with beater arms staggered with each other in the direction of rotation which beater arms may oscillate freely within their plane rotation.

12 Claims, 5 Drawing Figures

THRESHING MACHINE

The present invention relates to a threshing machine for peas.

DE-OS No. 24 19 420 describes a threshing machine consisting of a horizontally arranged revolving sieve drum on the inner wall of which are lifting beams which operate as threshing rails and in which are two beater shafts with their axles parallel to the central axle and which are located horizontally at a level which roughly touches the central axle of the sieve drum and run in the same direction as the sieve drum; together with the neighbouring lifting beams, they form one threshing zone each. Between the beater shafts and above them, there is a third counterbeam which runs in the opposite direction to the beater shafts and this, together with the two beater shafts, forms two additional threshing zones and conveys the threshed peas from one beater shaft to the next. The radial height of the beaters increases from the inlet end of the sieve drum to its outlet end, so that, seen as a section through the sieve drum, the width of the threshing zones formed together with the inner wall of the sieve drum decreases continuously from the inlet end to the outlet end. This kind of threshing machine may be part of a pea-picking machine which has a pulling cylinder at the front and which is located horizontally and laterally to the rows of pea vines which are to be picked and which extends across the whole width of the machine. Behind the pulling cylinder is a collection belt for the pulled pea pods which extends along the width of the pulling cylinder and conveys the peas towards the rear end of the machine: two lateral conveyors and a longitudinal elevator conveyor are added to the collection belt to press the pods towards the middle of the machine; the pods being conveyed from the ejection end of the longitudinal elevator conveyor into the revolving sieve drum.

A disadvantage of this type of machine is that the sieving capacity of the drum is not entirely utilised because the peas are not podded before they reach the sieve drum: podding commences in the first part of the drum and sieving can take place only after the peas have been podded. If the peas could be podded before entering the sieve drum then a greater part of the drum could be used for sieving and an attempt to do this is described in DE-OS No. 29 35 530 by fixing a beater mechanism at the ejection end of the longitudinal conveyor. This beater mechanism is arranged in such a way that its beater shaft runs laterally over the width of the longitudinal conveyor and has beater arms which, in their rotational direction, are staggered and, in the axial direction are arranged at a distance from each other and can oscillate freely within their plane of rotation and below a fixed hood which forms an inlet opening for the product to be threshed, in such a way that the vector of movement of the beater arms which turn above the longitudinal conveyer, points in the direction of conveyance of the longitudinal conveyor.

While the system described in DE-OS No. 29 35 530 increases the speed at which the crop passes from the longitudinal conveyor into the sieve drum and helps to reduce blockages at the entrance to the sieve drum, we have found that it produces no threshing effect and there is no improvement in the sieving capacity of the sieve drum over that of the sieve drum described in DE-OS No. 2419420. We have found surprisingly that if, instead of fixing a single beater mechanism above the longitudinal conveyor, a prebeater unit is fixed comprising a plurality of similar beater mechanisms which extend in a longitudinal direction above the longitudinal conveyor, the sieving capacity of the drum is increased dramatically because a large proportion of the pods are opened by the beater mechanism before entering the sieve drum.

Accordingly, the present invention provides a threshing machine for peas consisting of a horizontal sieve drum rotatable about a longitudinal axis, containing at least two beater shafts located with their axles parallel to the longitudinal axis of the sieve drum to form several threshing areas, a longitudinal conveyor at the inlet end of the sieve drum for throwing threshed product thereinto characterised in that a prebeater unit comprising a plurality of beater mechanisms extends in a longitudinal direction above the longitudinal conveyor and below a fixed hood, the beater mechanisms having shafts mounted laterally across the width of the longitudinal conveyor and equipped with beater arms staggered with each other in the direction of rotation which beater arms may oscillate freely within their plane of rotation.

In the prebeater unit, the beater arms are preferably staggered from each other by about 120°. The free ends of the beater arms are conveniently slightly curved or bent against the direction of rotation in order to avoid damage to the products being threshed. Each beater arm may be an elongated plate or flap extending substantially along the full length of the axle or it may consist of a plurality of individual arms or units arranged at a distance from each other in the direction of the axle; in the latter case the width of each beater arm is advantageously from 35 to 45 mm to give satisfactory threshing. The beater arms oscillate during rotation conveniently through an angle of from 2.5° to 7.5° and preferably from 4° to 6°. The speed of rotation of the beater arms during threshing is preferably such that the tangential speed of the free ends thereof is slightly higher than the conveying speed of the longitudinal conveyor. In the case of peas, the speed of rotation of the beater arms during threshing may be from 350 to 500, preferably from 375 to 475 and especially from 390 to 460 revolutions per minute.

Advantageously, the speed of rotation of the beater arms may be adjusted continuously.

The beater shaft may conveniently be a rotor-driven tube on which sheet metal discs have been welded at identical axial distances from each other and have mutually aligned bore-holes designed to house axles on which the beater arms are located in free oscillation. The beater arms are conveniently made of flat iron, mild steel, plastics or rubber.

The vector of movement of the rotating beater arms points in the direction of conveyance of the pea vines depending on whether they are conveyed in the space between the prebeater unit and the longitudinal conveyor, or in the space between the prebeater unit and the fixed hood in which case the fixed hood is preferably provided with one or more projections which extend into the space and act as brakes on the moving pea vines and increase the threshing efficiency. The angle between the inside face of the fixed hood and the side of the projections facing the oncoming pea vines is preferably from 110° to 130° and especially from 115° to 125°. The length of the projections is suitably from 30 to 40 mm and preferably from 32.5 to 37.5 mm.

The beater mechanisms are positioned so that when the free ends of the respective arms of rotating adjacent beater mechanisms are closest to one another the distance between the free ends is conveniently from 30 to 45 mm and preferably from 35 to 40 mm.

The distance between the longitudinal conveyor and the closest position of the free ends of the arms of the rotating beater mechanisms is suitably from 30 to 40 mm and preferably from 32.5 to 37.5 mm.

The distance between the free edge of a projection and the closest position of the free ends of the arms of the rotating beater mechanisms is conveniently from 55 to 70 mm and preferably from 60 to 65 mm.

The threshing machine of the present invention may also be part of pea picking machine such as the one described in DE-OS No. 24 19 420.

The present invention is further described by way of example with reference to the accompanying drawings in which.

Figure 1:
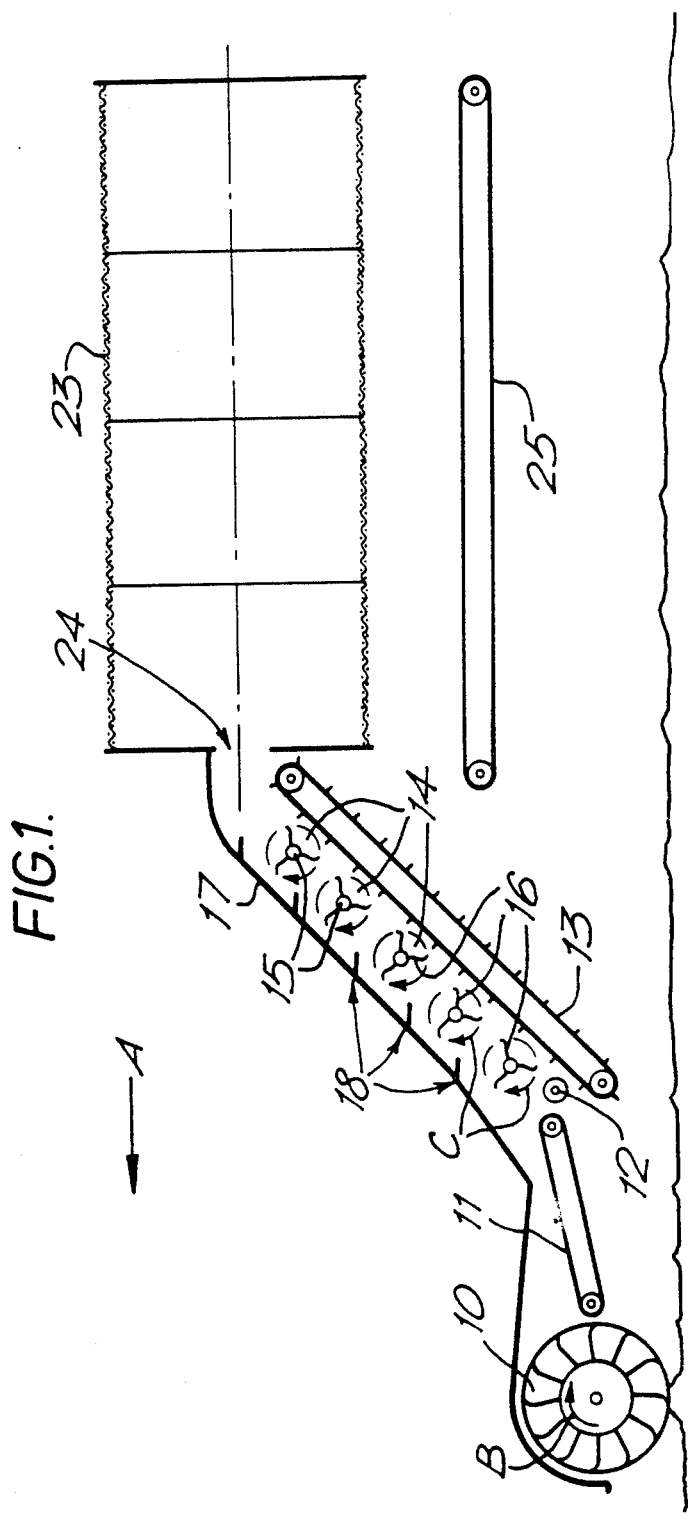
FIG. 1 is a diagrammatic lateral view of a threshing machine.
Figure 2:
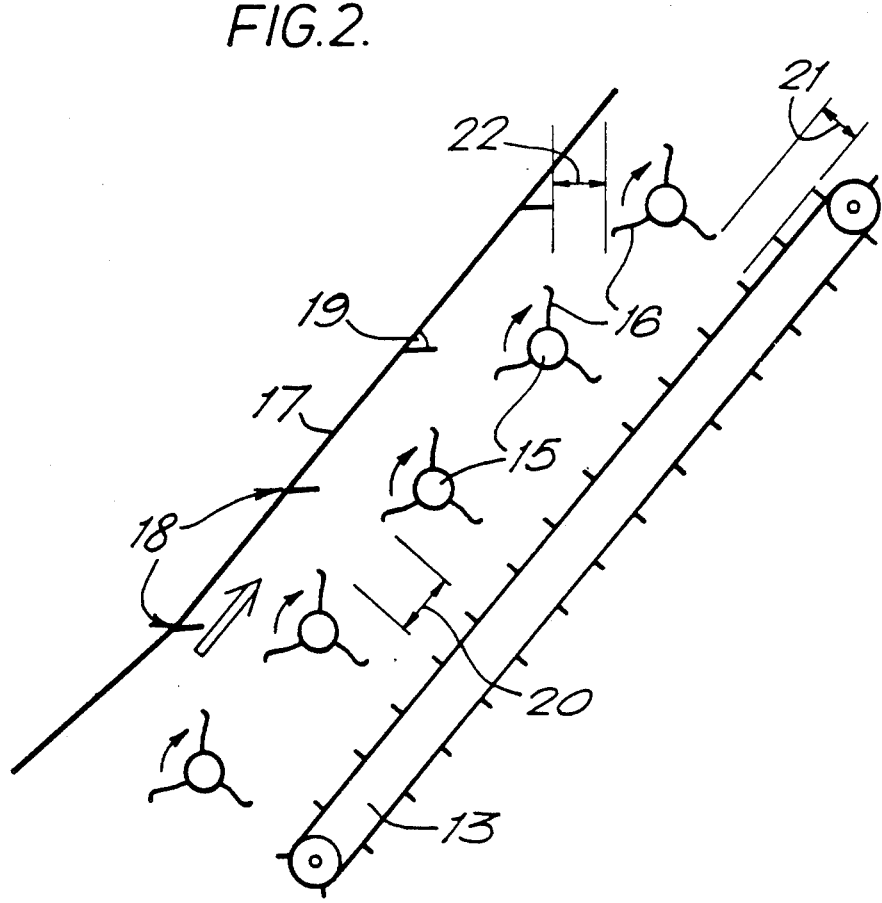
FIG. 2 is a sectional lateral view of the prebeater unit extending between the longitudinal conveyor and the fixed hood.

Referring to the drawings, at the front end of the machine is a pulling cylinder 10 behind which is a collection belt 11, followed by a pick-up device 12 and then a longitudinal conveyor belt 13 extending longitudinally above which are beater mechanisms 14 having shafts 15 and arms 16. Above the beater mechanisms is a fixed hood 17 fitted with projections 18 having a length of 35 mm at an angle 19 of 120°. The distance 20 is 38 mm, the distance 21 is 35 mm and the distance 22 is 62 mm. Behind the longitudinal conveyor belt 13 is a sieve drum 23 with an inlet 24 below which is a collecting belt for peas 25. The pulling cylinder 10, the collection belt 11, the conveyor belt 13 and the sieve drum 23 are similar to those described in DE-OS No. 24 19 420 and each beater mechanism 14 is similar to that described in DE-OS No. 29 35 530 as shown in FIG. 3, or FIG. 4, referred to later.

Figure 5:
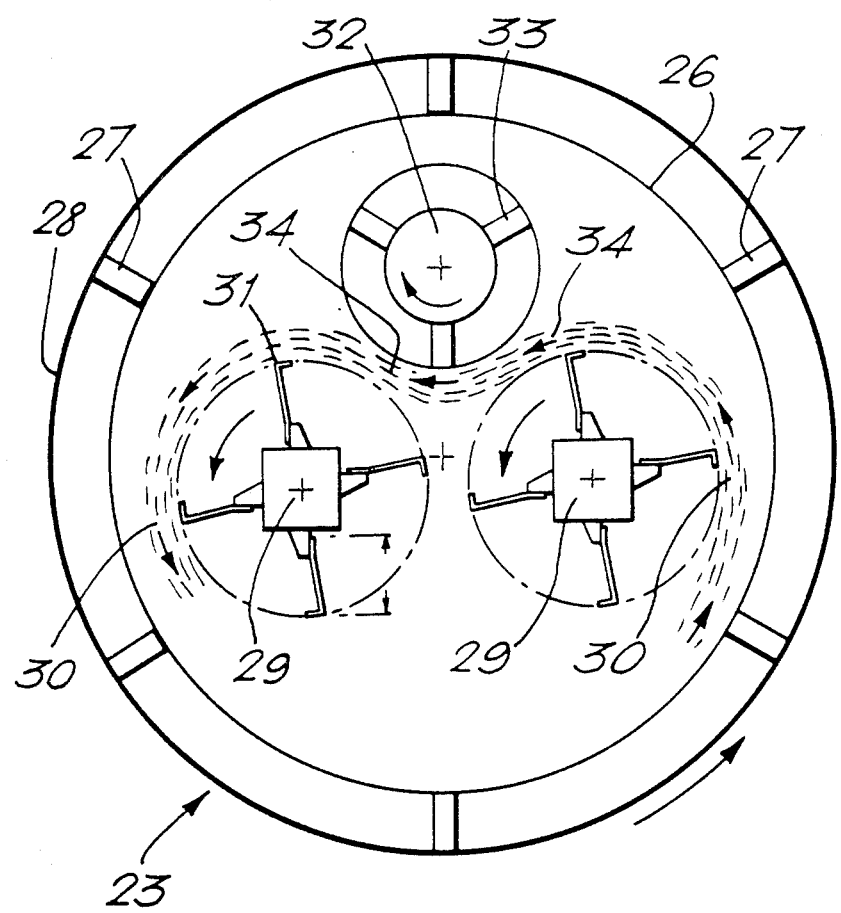

FIG. 5 shows the arrangement of the sieve drum 23 which is provided on its inside wall 26 with lifting beams 27 which operate as threshing rails. The cover of the sieve drum 23 is formed by sieving nets 28 spreading over the complete drum circumference. Inside the sieve drum in a horizontal plane at the approximate level of the sieve drum central axis, two beater shafts 29 rotating in the same direction as the sieve drum are mounted axially in parallel, each forming a threshing zone 30 together with the respectively adjacent lifting beams 27 of the sieve drum. The beater shafts 29 are provided with beater arms 31 with their free ends bent at right angles against the direction of rotation. Between and above these two beater shafts 29 is a third counter-rotating shaft 32, fitted with axle-parallel lifting beams 33, which forms two further threshing zones 34 with the two beater shafts 29. The threshing products, which have been thrown into the sieve drum 23 via the inlet 24 and have been fed by the lifting beam 27 into the area of the first threshing zone 30, are transported by the counter-rotating shaft 32 from one beater shaft to the other in the direction of the arrows. The lifting beams 33 of the counter-rotating shaft 32 serve as a block owing to the slower rotation speed of the counter-rotating shaft 32 compared with the beater arms 31 of the beater shafts 29. The radial height of the beaters increases from the sieve drum intake side to its discharge side, so that, viewed as a section through the sieve drum the width of the threshing zones formed with the inside walls of the sieve drum continually decreases from the intake side to the discharge side.

Figure 3:
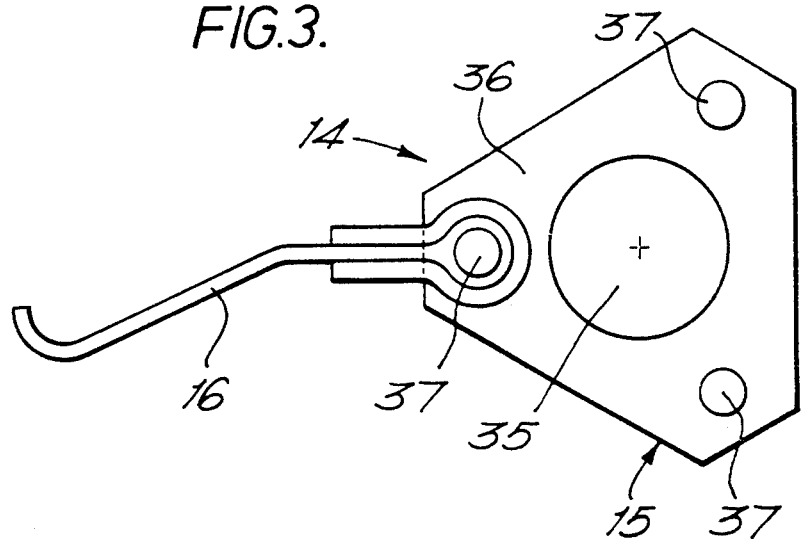
FIGS. 3 and 4 are transverse views of two beater mechanisms and FIG. 5 is a cross-section of a sieve drum.
Figure 4:
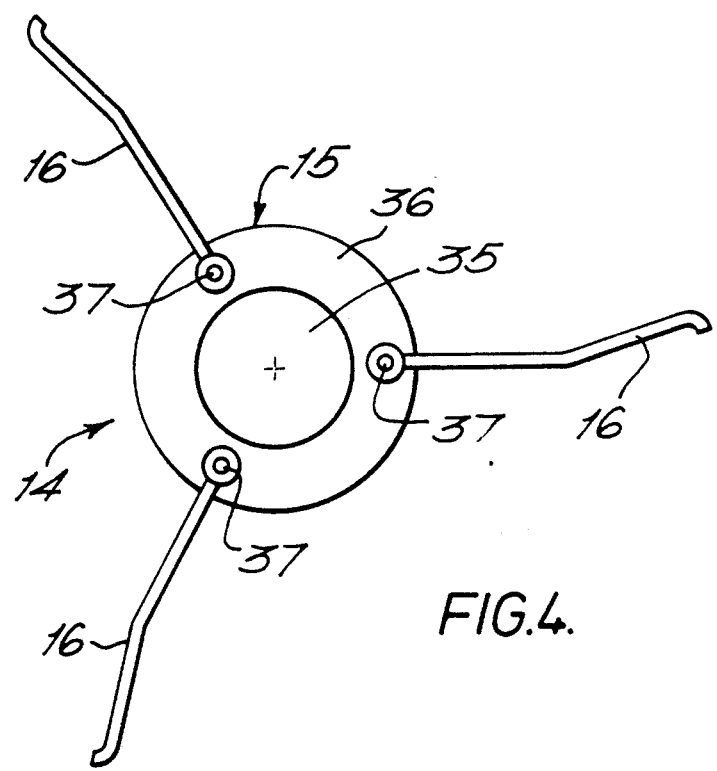

In FIGS. 3 and 4, two types of beater mechanism 14 are shown in detail. Each has a shaft 15 consisting of a rotor-driven tube 35 passing through a plurality of metal plates 36 welded to the tube, for example, at identical axial distances from one another. Each plate 36 is provided with aligned holes for the insertion of axles 37, one axle passing through each line of holes, on which the beater arms 16 are attached so that they can swing freely within their plane of rotation. Each beater arm 16 may be an elongated plate extending along the length of the axle 37, or it may consist of a plurality of arms spaced apart in the axial direction, each of 40 mm width.

In operation, the machine moves in the direction of the arrow A in FIG. 1 and pea vines are gathered by the pulling cylinder 10 which rotates in the direction of the arrow B so that the vines pass over the top of it and pass over the collection belt 11 and the pick-up device 12. The peas vines pass through the space between the fixed hood 17 and the beater mechanisms 14 which rotate in the direction of the arrows C. The threshing action is enhanced by the projections 18 attached to the fixed hood and after passing over all the beater mechanisms the threshed peas are thrown into the sieve drum 23 via the inlet 24 where the peas pass through the sieves onto the collecting belt 25.

The effectiveness of the threshing machine described above with reference to the drawings was compared with one described in DE-OS No. 24 19 420 in harvesting peas. The percentage peas in the respective fields, the ground speed (meters/hour), the amount of vine harvested (tons/hour), the amount of peas threshed (tons/hour), the percentage waste loose peas and unthreshed pods are given in the following Table I.

TABLE I

| Field | Pea % | Ground speed | Capacity (t/h) vine | Capacity (t/h) peas | Waste % Loose peas | Waste % Unthreshed pods |
| --- | --- | --- | --- | --- | --- | --- |
| A | 16% | 1765 | 12.4 | 1.99 | 2.2 | 0.7 |
| A | 16% | 1936 | 13.6 | 2.18 | 2.5 | 1.5 |
| B | 15% | 1216 | 13.6 | 2.04 | 1.2 | 0.9 |
| B | 15% | 1343 | 15.0 | 2.25 | 3.5 | 1.7 |
| C | 14% | 1818 | 15.1 | 2.11 | 1.1 | 2.2 |
| Mean value | | 1616 | 13.9 | 2.11 | 2.1 | 1.4 |
| D | 11% | 1765 | 20.9 | 2.30 | 1.1 | 0.3 |
| E | 17% | 1636 | 19.4 | 3.29 | 0.4 | 0.6 |
| F | 22% | 2000 | 22.4 | 4.93 | 0.7 | 2.0 |
| F | 22% | 1714 | 19.2 | 4.22 | 1.7 | 2.1 |
| G | 17% | 1846 | 19.5 | 3.31 | 0.2 | 0.8 |
| G | 17% | 2057 | 21.7 | 3.69 | 1.7 | 0.3 |
| Mean value | | 1836 | 20.5 | 3.62 | 0.97 | 1.02 |

A threshing machine similar to that described in DE-OS No. 24 19 420 was used in Fields A, B and C while the machine described in the specific example of the present invention was used in Fields D, E, F and G. The increased capacity and reduced waste is clearly illustrated in the above table. There is also a significant improvement in the performance of the threshing machine of this invention over that described in DE-OS No. 29 35 530.

I claim:

1. A threshing machine for peas comprising a horizontal sieve drum rotatable about a longitudinal axis, containing at least two beater shafts located with their axes parallel to the longitudinal axis of the sieve drum to form several threshing areas, and a longitudinal conveyor at the inlet end of the sieve drum for throwing threshed product thereinto characterised in that a prebeater unit comprising a fixed hood and a plurality of prebeater mechanisms extends in a longitudinal direction above the longitudinal conveyor, the prebeater mechanisms being disposed above the conveyor and below said fixed hood, the prebeater mechanisms having prebeater shafts mounted laterally across the width of the longitudinal conveyor, said prebeater shafts being equipped with beater arms staggered with each other in the direction of rotation which beater arms may oscillate freely with respect to the prebeater shafts within their plane of rotation, the machine further comprising means for rotating said sieve drum, beater shafts and prebeater shafts, said rotation means being operative to rotate said prebeater shafts so that the vector of movement of the beater arms adjacent the fixed hood points toward said sieve drum, whereby the pea vines are conveyed toward the sieve drum between the prebeater shafts and the fixed hood and the peas vines are engaged by the beater arms and the fixed hood.

2. A threshing machine according to claim 1 characterised in that each beater arm is an elongated plate extending substantially along the full length of the associated prebeater shaft.

3. A threshing machine according to claim 1 characterised in that each beater arm consists of a plurality of individual arms arranged at a distance from each other in the direction of the associated prebeater shaft.

4. A threshing machine according to claim 3 characterised in that the width of each individual arm is from 35 to 45 mm.

5. A threshing machine according to claim 1 characterised in that the beater arms can oscillate during rotation through an angle of from 4° to 6°.

6. A threshing machine according to claim 1 characterised in that said rotation means is operative to rotate each of said prebeater shafts at 390 to 460 revolutions per minute.

7. A threshing machine according to claim 1 characterised in that the fixed hood is provided with one or more projections which extend into the space between the prebeater units and the fixed hood.

8. A threshing machine according to claim 7 characterised in that the angle between the inside face of the fixed hood and the side of the projections facing the pea vines is from 115° to 125°.

9. A threshing machine according to claim 7 characterised in that the length of the projections is from 32.5 to 37.5 mm.

10. A threshing machine according to claim characterised in that the prebeater mechanisms are positioned so that when the free ends of the beater arms on adjacent prebeater shafts are closest to one another, the distance between such free ends is from 35 to 40 mm.

11. A threshing machine according to claim 7 characterised in that the distance between the free edge of a projection and the closest position of the free ends of the arms of the rotating prebeater mechanisms is from 60 to 65 mm.

12. A prebeater unit for the preliminary threshing of peas, prior to full threshing in a threshing machine for peas, the prebeater unit being mounted in use at the discharge end of a longitudinal conveyor for discharging the harvested pea crop into the threshing machine and comprising a fixed hood and a plurality of prebeater mechanisms the prebeater unit extending in use in a longitudinal direction above the longitudinal conveyor with the prebeater mechanisms disposed above the conveyor and below said fixed hood, the prebeater mechanisms having prebeater shafts mounted laterally across the width of the longitudinal conveyor, said prebeater shafts being rotatable and being equipped with beater arms staggered with each other in the direction of rotation which beater arms may oscillate freely with respect to said prebeater shafts within their plane of rotation the prebeater unit also including means for rotating said prebeater shafts so that the vector of movement of the beater arms adjacent the fixed hood points toward the discharge end of the conveyor, whereby the pea vines are conveyed toward the discharge end of the conveyor between the prebeater shafts and the fixed hood and the pea vines are engaged by the beater arms and the fixed hood.

* * * * *

UNITED STATES PATENT AND TRADEMARK OFFICE
CERTIFICATE OF CORRECTION

PATENT NO. : 4,489,735
DATED : December 25, 1984
INVENTOR(S) : Yngve R. Akesson

It is certified that error appears in the above—identified patent and that said Letters Patent is hereby corrected as shown below:

Column 4, line 24, "peas" should read -- pea --.

Claim 1, column 5, line 23, "peas" should read -- pea --.

Claim 10, column 6, line 10, after "claim" insert a
-- 1 --.

Signed and Sealed this

Thirteenth Day of August 1985

[SEAL]

Attest:

DONALD J. QUIGG

Attesting Officer    Acting Commissioner of Patents and Trademarks